United States Patent [19]
Hayes et al.

[11] Patent Number: 5,909,583
[45] Date of Patent: Jun. 1, 1999

[54] METHOD FOR MAKING REDUNDANT POWER SUPPLIES HOT-PLUGGABLE

[75] Inventors: Stuart W. Hayes; Erik A. Schuchmann, both of Austin, Tex.

[73] Assignee: Dell USA, L.P., Round Rock, Tex.

[21] Appl. No.: 08/785,490

[22] Filed: Jan. 17, 1997

[51] Int. Cl.⁶ .................................................. G06F 1/26
[52] U.S. Cl. ................. 395/750.01; 395/750.06
[58] Field of Search ........................... 395/750.01–750.08

[56] References Cited

U.S. PATENT DOCUMENTS

| | | | |
|---|---|---|---|
| 4,016,408 | 4/1977 | Koetzle | 235/153 A |
| 5,513,062 | 4/1996 | Paul et al. | 361/90 |
| 5,655,749 | 8/1997 | Mauerhofer | 351/129.04 |
| 5,701,894 | 12/1997 | Cherry et al. | 128/630 |
| 5,705,929 | 1/1998 | Caravello et al. | 324/430 |
| 5,717,310 | 2/1998 | Sakai et al. | 320/15 |
| 5,744,962 | 4/1998 | Alber et al. | 324/426 |
| 5,745,419 | 4/1998 | Brauch | 365/201 |
| 5,767,661 | 6/1998 | Williams | 320/152 |

*Primary Examiner*—Ayaz R. Sheikh
*Assistant Examiner*—David A. Wiley
*Attorney, Agent, or Firm*—Skjerven, Morrill, MacPherson, Franklin & Friel, LLP; David G. Dolezal

[57] ABSTRACT

It has been discovered that providing a computer system with a hot pluggable power supply as well as a disconnectable resistive load allows a second power supply to be brought on-line while operating within the proper voltage range and then disconnecting the resistive load from the power supply so as to conserve energy and lower the operating temperature of the computer system. Such a system also conserves energy by reducing the size of the fan that the computer system requires. Such a system also allows for a the use of larger test resistor thus providing a more accurate load test. Such a system also allows for saving space as one test circuit can be used for both power supplies. Such a system also allows for a reduced capacity power supply as the power supply does not have to continuously supply power to the resistive test load.

43 Claims, 5 Drawing Sheets

METHOD FOR MAKING REDUNDANT POWER SUPPLIES HOT-PLUGGABLE

BACKGROUND OF THE INVENTION

1. Field of the Invention

This invention relates to a computer system and more specifically to supplying electrical power for a computer system.

2. Description of the Related Art

Computer systems in general and International Business Machines (IBM) compatible personal computer systems in particular have attained widespread use for providing computer power to many segments of today's modern society. A computer system generally includes a system processor which is coupled to associated volatile and non-volatile memory. A personal computer system can generally be defined as a desk top, floor standing, or portable computer system that further includes a display monitor, a keyboard, one or more floppy disk drives, and a fixed disk storage device. One of the distinguishing characteristics of personal computer systems is the use of a system board to electrically connect these components together. A personal computer system may also include one or a plurality of input/output (I/O) devices (i.e. peripheral devices) which are coupled to the system processor and which perform specialized functions. Examples of I/O devices include modems, sound and video devices or specialized communication devices. Mass storage devices such as hard disks, CD-ROM drives and magneto-optical drives may also be considered peripheral devices.

As the computing power of personal computer systems has grown, these personal computers systems are now used as network server systems. Network server systems manage the shared storage or processing requirements of groups of personal computer systems. An example of one such network server system is available from Dell Computer Corporation under the trade designation Dell Poweredge 4100.

One concern associated with the design of a computer system is how to reliably supply electrical power to the computer system. Several components of the computer system require power to operate and those components may require power at different voltage levels. For example, the computer system may have a Direct Current (DC) brushless motor fan that requires power at +12 volts direct current (VDC) to rotate to cool the computer system. The disk drives of the computer system may also operate at +12 VDC. The microprocessor, random access memory (RAM) and other electronic components may operate at either or both +5 VDC and +3.3 VDC signal voltages. Additionally, the computer system may require −5 VDC, −12 VDC and +5 V flea power (FP). Each of these components are connected to the power supplies via respective power nodes.

One source of power for a computer system is a battery power supply where the power for the computer is provided by batteries. Another source of power for a computer system is a power converter that converts Alternating Current (AC) to DC. One type of power converter converts alternating current from an 120 volt AC source provided to most homes and business into DC voltages at different voltage levels.

A problem in supplying power to a computer system is that a failure of a power supply may cause the computer system to crash. One way to prevent these power sources from failing is to regularly replace the power supply or add a redundant power supply.

Normally, installing a new power source to computer system requires that the computer system be shut down. One method to avoid a shut down is to install a second power supply while a first power supply is supplying power to the computer system. In this method, the second power supply is referred to as a hot-pluggable power supply as the power supply is installed while the computer system is operating. However, installing a second power source while the computer system is operating may cause voltage problems in the computer system. For example, switching a second power supply on-line that is operating at below specified voltage levels can cause the voltage level of the computer system to dip and possibly cause the entire computer system to shut down.

To remedy this problem of switching a power supply on-line, resistive loads are connected to the outputs of the power supplies. For example, referring to FIG. 1, a known system for supplying power to a computer system is shown. The system includes power supply 101 and power supply 104. Power supply 101 supplies a DC voltage to the computer system via an output terminal 107. Power supply 104 supplies a DC voltage to the computer system via an output terminal 110. At power-up, switch 124 is closed and power supply 104 supplies the computer system with power. Additionally, switch 121 is also closed and power supply 101 supplies the computer system with power. Thus, the output terminals 107 and 110 of power supply 101 and power supply 104 are coupled. Consequently, if power supply 101 is operating at a lower voltage than a specified voltage and switch 121 is closed, power supply 101 pulls the voltage level at the computer system power input terminal 127 below the specified voltage level and thus could bring the entire computer system down.

To remedy the potential problem of power supply 101 supplying power to the system below a specified voltage level, a resistive load 129 is connected to the output terminal 107 of power supply 101. Before switch 121 is closed, output terminal 107 is connected to resistive load 129 to provide an initial load. Control circuit 131 then closes switch 121 to provide additional computer system load. After the computer system load is connected, the power supplies are monitored to determine whether they are operating within specification. However, resistive load 127 remains connected in parallel with the computer system load. Consequently resistive load 127 dissipates power as heat energy which the cooling system of the computer system must remove. Resistive load 134 is coupled to power supply 104 to provide a load to power supply 104 when switch 124 is open.

One problem with the above remedy is that after the power supply is supplying power to the system, the resistive load is still connected. Thus, the resistive load is still consuming power from the power supply. Consequently, a larger power supply must be used. Furthermore, because the resistive load is being powered by the power supply, the resistive load produces heat which can shorten the working life of other computer system components. Additionally, because the power supply is not tested until after it is connected to the computer system, the power supply can cause the computer system to crash before any problem with the power supply is detected.

SUMMARY OF THE INVENTION

It has been discovered that providing a computer system with a hot pluggable power supply as well as a disconnectable resistive load allows a second power supply to be brought on-line while operating within the proper voltage range and then disconnecting the resistive load from the power supply so as to conserve energy and lower the operating temperature of the computer system. Such a system also conserves energy by reducing the size of the fan that the computer system requires. Such a system also allows for a the use of larger test resistor thus providing a more accurate load test. Such a system also allows for saving space as one test circuit can be used for both power supplies. Such a system also allows for a reduced capacity power supply as the power supply does not have to continuously supply power to the resistive test load.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The following sets forth a detailed description of the best contemplated mode for carrying out the invention. The description is intended to be illustrative of the invention and should not be taken to be limiting.

Figure 1:
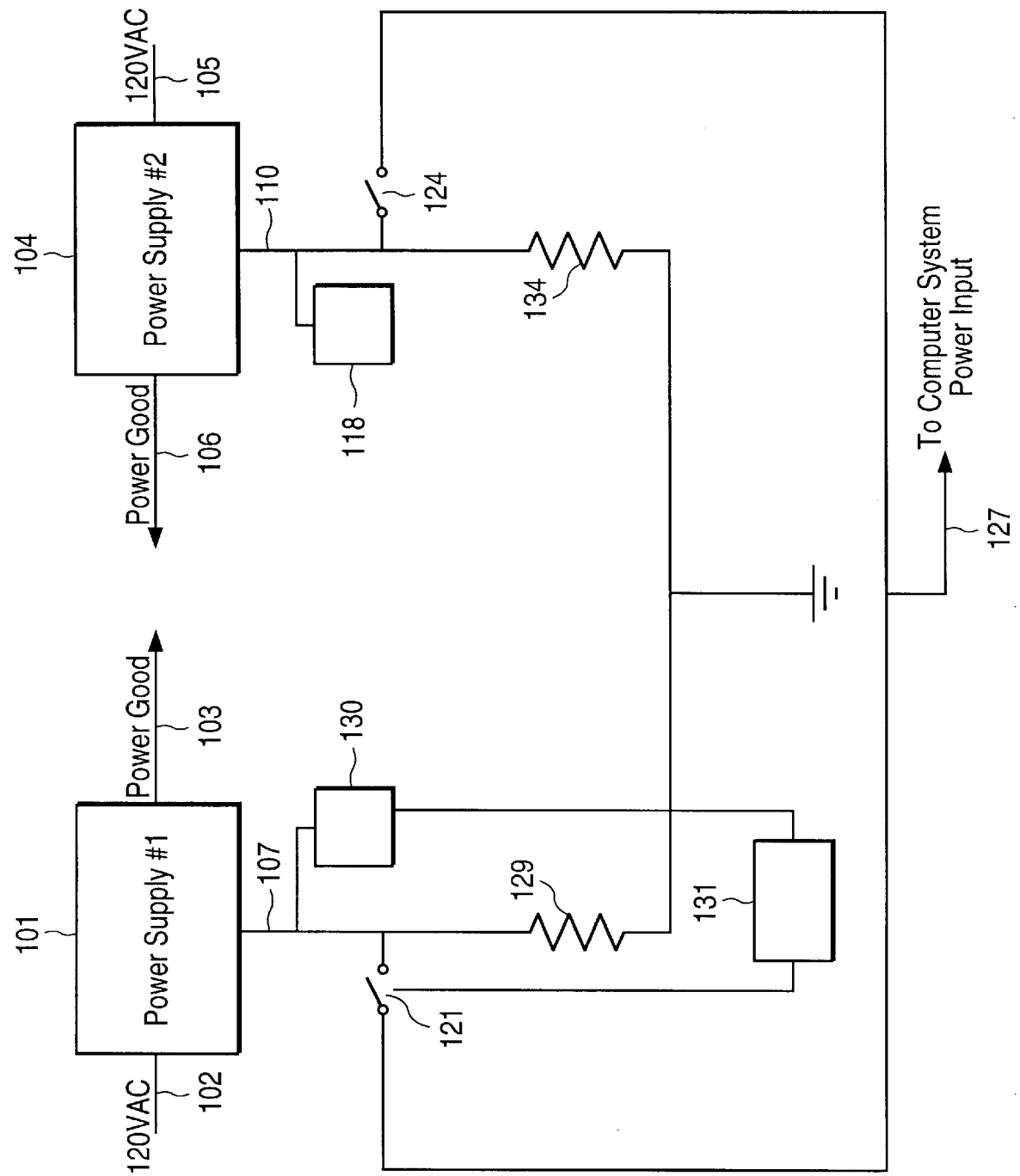
FIG. 1, labeled prior art, is a block diagram of a system for supplying power to a computer system.
Figure 2:
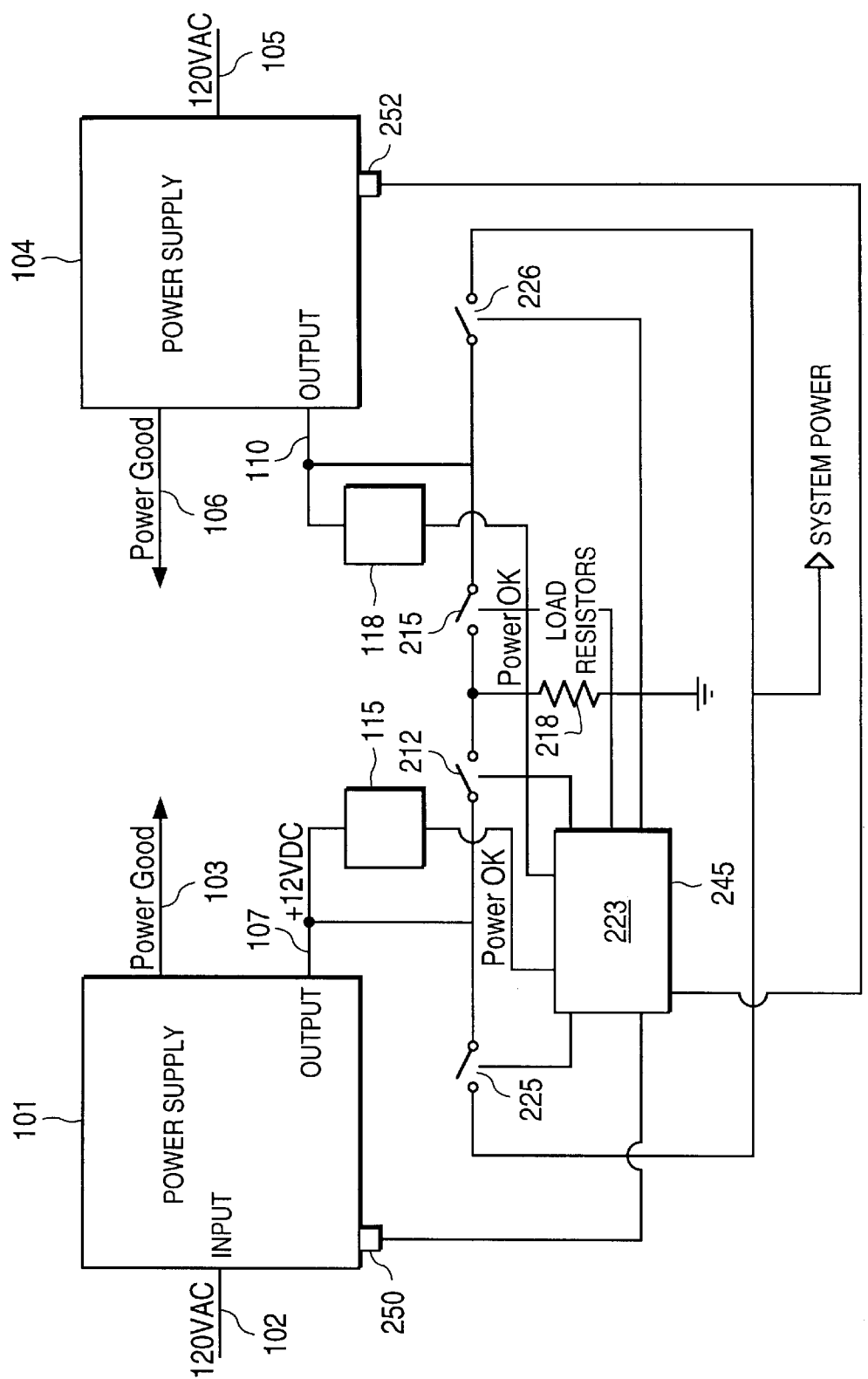
FIG. 2 is a block diagram of one embodiment of a system for supplying power to a computer system in accordance with the present invention.

Referring to FIG. 2, an exemplative embodiment of a system for supplying power to a computer system is shown. System 200 includes power supply 101 and power supply 104. Power supplies 101 and 104 each receives a 120 VAC input voltage and provide a +12 VDC output voltage. Power supplies 101 and 104 also provide respective power good signals. Those skilled in the art will recognize that a converter could convert AC power supplied at different voltages and/or different frequencies such as, for example, 110 volts AC at 50 Hz.

Output terminal 107 of power supply 101 is coupled to first terminals of switch 225 and switch 212. In this embodiment switches 225 and 212 are FET transistors. Those skilled in the art will recognize that relay contacts and other types of controllable switches could also be used. A second terminal of switch 212 is coupled to resistive load 218. Accordingly, switch 212 connects power supply output terminal 107 with resistive load resistor 218. A second terminal of switch 225 is coupled to the computer system power input.

The output terminal 110 of power supply 104 is connected a first terminal of switch 215 and a first terminal of switch 226. A second terminal of switch 215 is coupled to resistive load 218. A second terminal of switch 226 is coupled to the computer system power input.

Test circuits 115 and 118 test the voltage at the outputs 107 and 110 of the power supplies 101 and 104, respectively. Test circuit 115 and test circuit 118 each provide a respective power OK signal to the control circuit 233. The power ok signals indicate that the respective power supply is operating within specified parameters, such as the proper voltage. Control circuit 223 is also coupled to power supply detect circuits 250, 252, which indicate when a power supply is physically present within the power supply system. Control circuit 223 controls opening and closing switches 225, 212, 215, and 226 based upon the status of the power ok signals and the power supply detect circuits 250, 252. In another embodiment, a single test circuit tests both power supply 101 and power supply 104. In another embodiment, the control circuit 223 and the test circuit are combined within the same circuit.

Resistive load 218 is coupled to switches 212 and 215. Resistive load 218 is also coupled to ground. In the preferred embodiment, resistive load 218 is an approximately 12 ohm resistor.

Power supplies 101, 104 provide power at +12 VDC. However, it will be appreciated that the power supply system may function with power supplies supplying other voltages such as +5 VDC, +3.3 VDC, −5 VDC, and −12 VDC.

In operation, during an initial operating mode, power supply 104 supplies power at +12 VDC to the computer system power input 137. During this initial operating mode, control circuit 223 controls switches 232, 215, 223 and 225 so that switch 226 is closed and switches 225, 212, and 215 are open. Power supply 101 may then be physically installed in the system. In preparation for installing power supply 101, control circuit 223 closes switch 212 to connect the +12 VDC output of power supply 101 to the resistive load 218. Power supply 101 thus supplies electrical current through resistive load 218. Power supply 101 is then tested by test circuit 115 to determine whether the voltage level of the output is stabilized to within a specified voltage range. Once the voltage level has stabilized to within a specified voltage range, control circuit 223 closes switch 225, thus connecting the output of power supply 101 to the computer system via computer system power input 137. Because the output voltage level is stable to within the specified range, tying the outputs of power supplies 101 and 104 together does not drag the voltage that is provided to computer system 137 below a level that could shut the computer system down. In the preferred embodiment, the voltage at the +12 VDC output must stabilize to within the range of +12 VDC±5% before control circuit 223 closes switch 225.

Once the output of power supply 101 is coupled to the computer system power input 137, the control circuit 223 opens switch 212. Thus, the power supply 101 no longer supplies power to resistive load 218. This advantageously allows the computer system to consume less power and produce less heat as no power is being wasted on resistive load 218 once its function of providing a test load is completed. Accordingly, a smaller power supply can be used as the test load is not supplied power while the power supply is supplying power to the computer system. Disconnecting the test load after testing also allows a larger test resistor to be used. Thus, the power supply can be tested under a heavier load that more accurately reflects the load requirements of the computer system.

If the voltage level of power supply 101 does not stabilize within the specified range, then switch 225 remains open. The control circuit 223 provides a power supply bad signal to the computer system.

After power supply 101 begins supplying power to the computer system, power supply 104 may be removed from the computer system without shutting the computer system down. The control circuit opens switch 226 so that power supply 104 no longer provides power to the computer system power input 137.

To reinstall power supply 104, the control circuit 223 closes switch 215 and the output of power supply 104 supplies current to the resistive load 218. Once the voltage level of output 110 stabilizes to within a specified voltage range, the control circuit 223 closes switch 226 thus connecting the output of power supply 104 to the computer system power input 137. Thus, the outputs of power supply 101 and power supply 104 are electrically coupled. The control circuit 223 then opens switch 215 to decouple the output of power supply 104 from the test resistive load 218. Using the same test resistive load for both power supplies advantageously reduces the amount of space required for the testing system as well as the cost associated with provided independent resistive loads.

Figure 3:
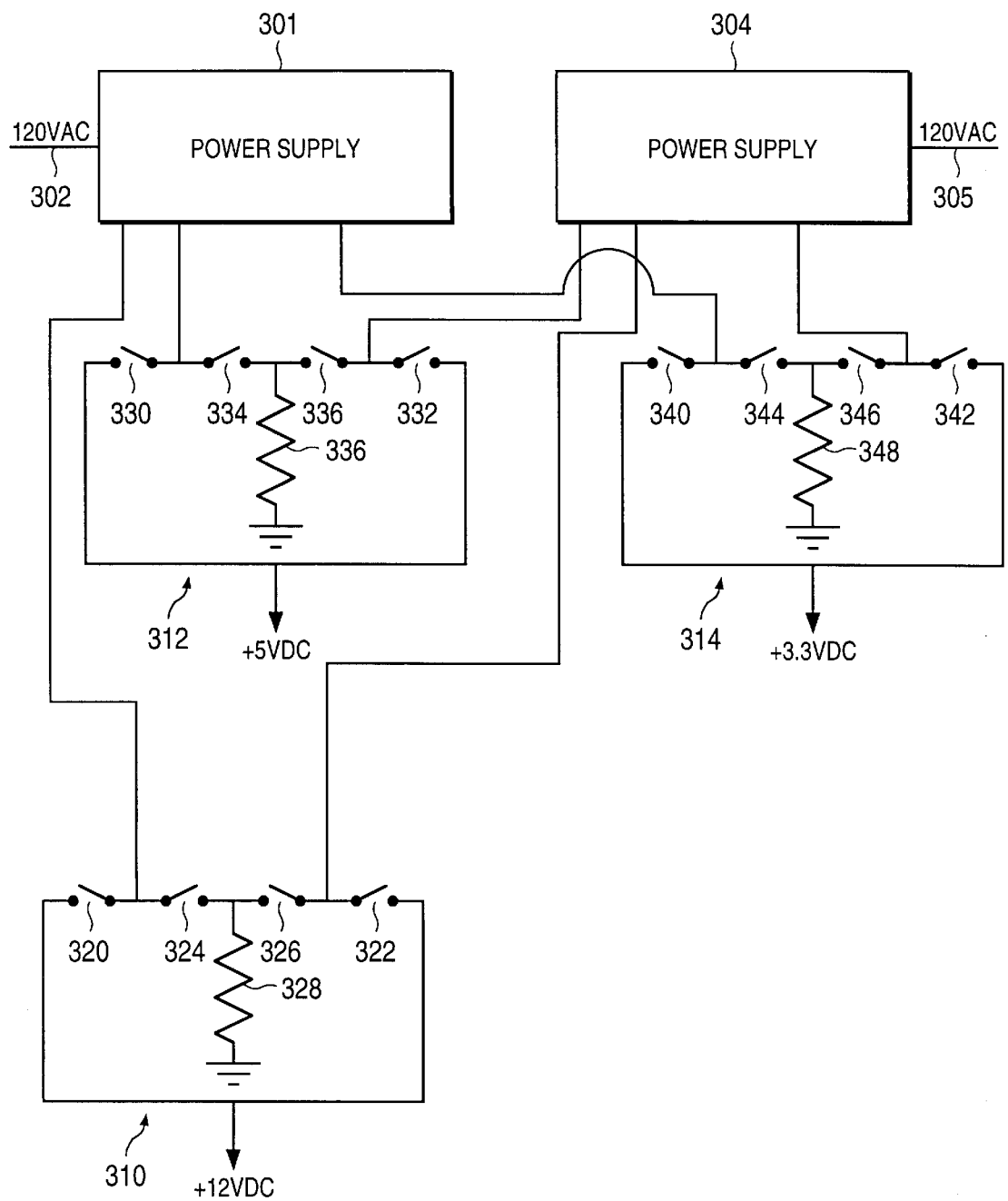
FIG. 3 is a block diagram of another embodiment of a system for supplying power to a computer system in accordance with the present invention.

FIG. 3 shows a power supply system 300 where the power supplies 301 and 304 supply power to the system at multiple voltage levels. Power supply system 300 includes test and load circuits for each respective voltage level. More specifically, power supply 301 and power supply 304 each receive a 120 VAC input and supply power at +12 VDC, +5 VDC and +3.3 VDC. Power supply system 300 includes a +12 VDC test and load circuit 310, a +5 VDC test and load circuit 312 and a +3.3 VDC test and load circuit 314.

Test and load circuit 310 is similar to the test circuit shown in FIG. 2. The +12 VDC outputs of power supply 301 and power supply 304 supply +12 VDC to circuit 310. Switches 320 and 322 couple the +12 VDC outputs of power supplies 301 and 304 respectively to the +12 VDC computer system power input. Switches 324 and 326 connect resistive load 328 to the +12 VDC outputs of power supply 301 and power supply 304, respectively. The other end of resistive load 328 is connected to ground.

Test and load circuit 312 is similar to test and load circuit 310 except that it receives +5 VDC from power supply 301 and power supply 304. Switches 330 and 332 connect the +5 VDC outputs to a +5 VDC computer system power input. Switches 334 and 336 connect resistive load 338 to the +5 VDC outputs of power supply 301 and power supply 304, respectively. The other end of resistive load 338 is connected to ground. Resistive load 338 is approximately 1.0 Ohms.

Test and load circuit 314 is similar to test and load circuit 310 except that it receives +3.3 VDC from power supply 301 and power supply 304. Switches 340 and 342 respectively connect the +3.3 VDC outputs of power supply 301 and power supply 304, to the +3.3 VDC computer system power input 365. Switches 344 and 346 respectively connect the +3.3 VDC outputs of power supply 301 and power supply 304 to resistive load 348. The other end of resistive load 348 is connected to ground. Resistive load 348 is approximately 3.3 Ohms.

The +12 VDC, +5 VDC and +3.3 VDC outputs of power supply 301 and power supply 304 are all connected to detect circuits and test circuits (not shown). As with FIG. 2, the outputs of these test circuits are connected to a control circuit (not shown) Additionally, all of the switches of the test and load circuits 310, 312, 314 are controlled by a control circuit as with the circuit shown in FIG. 2.

In operation, the +5 VDC test and load circuit 312, the +3.3 VDC test and load circuit 314, and the +12 VDC test and load circuit 310 operate as the circuit in FIG. 2. The control circuit (not shown in FIG. 3) does not close switches 330, 340, and 320 to couple the outputs of power supply 301 to the +5 VDC computer system power input, the +3.3 VDC computer system power input, and the +12 VDC computer system power input, respectively, until all three voltage level outputs are operating within specified voltage ranges. If any one of the outputs does not stabilize, then the control circuit does not close any of the three switches that connect the power supply 301 to the computer system. The voltage range of the +12 VDC output of supplies 301 and 304 is as discussed above with reference to FIG. 2. The voltage at the +5 VDC output must stabilize to within the range of +5 VDC±5% before power supply 301 can supply power to the computer system. The voltage at the +3.3 VDC output must stabilize to within a range of +3.3 VDC±5% before the power supply 301 can supply power to the computer system.

Figure 4:
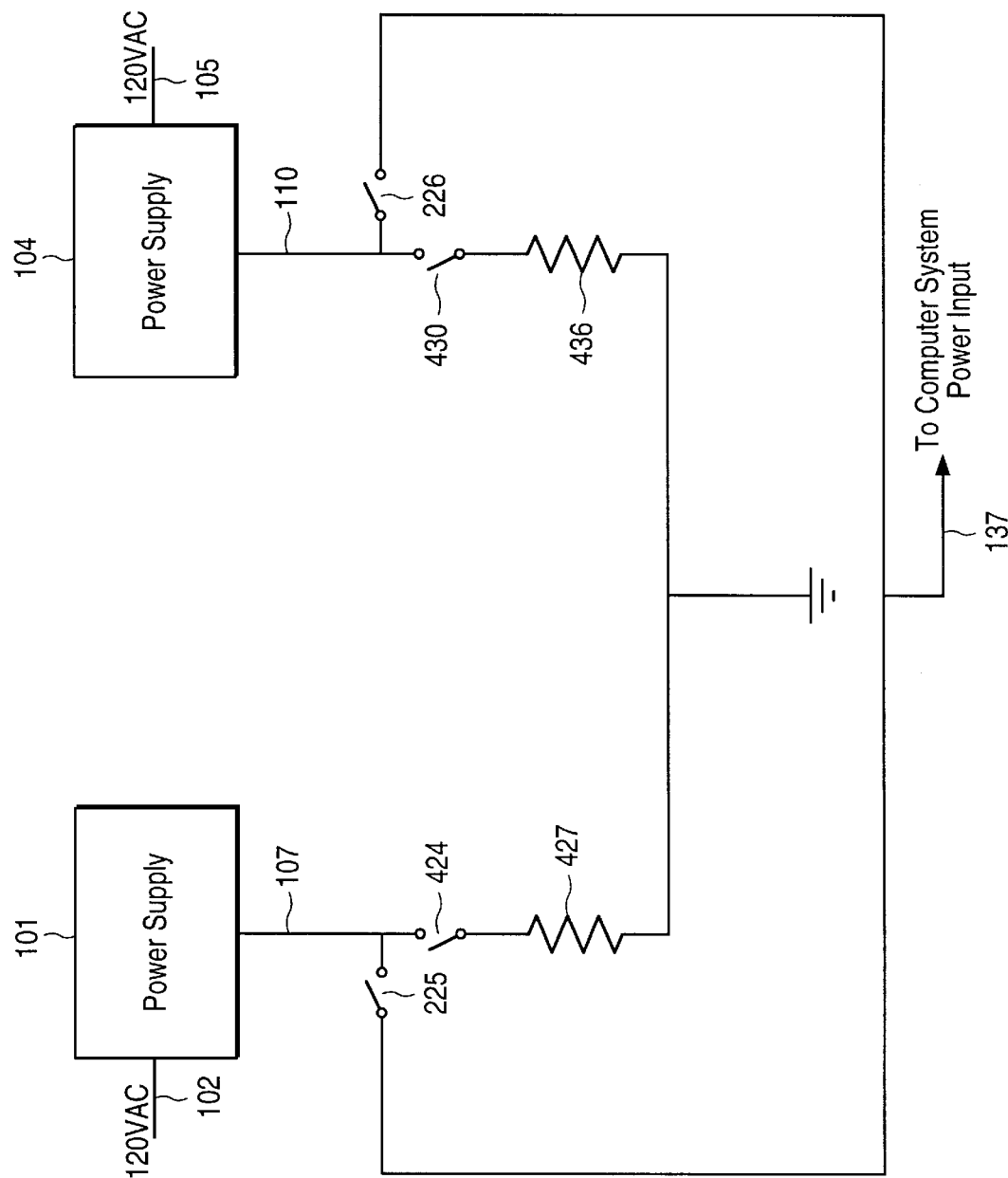
FIG. 4 is a block diagram of another embodiment of a system for supplying power to a computer system in accordance with the present invention.

Referring to FIG. 4, in another embodiment of the present invention, each power supply output includes its own respective resistive test load. In this embodiment, the output of power supply 101 is coupled to resistor 427 via switch 424. The output of power supply 104 is connected to resistor 436 via switch 430. Resistive loads 427 and 436 are connected to ground.

Figure 5:
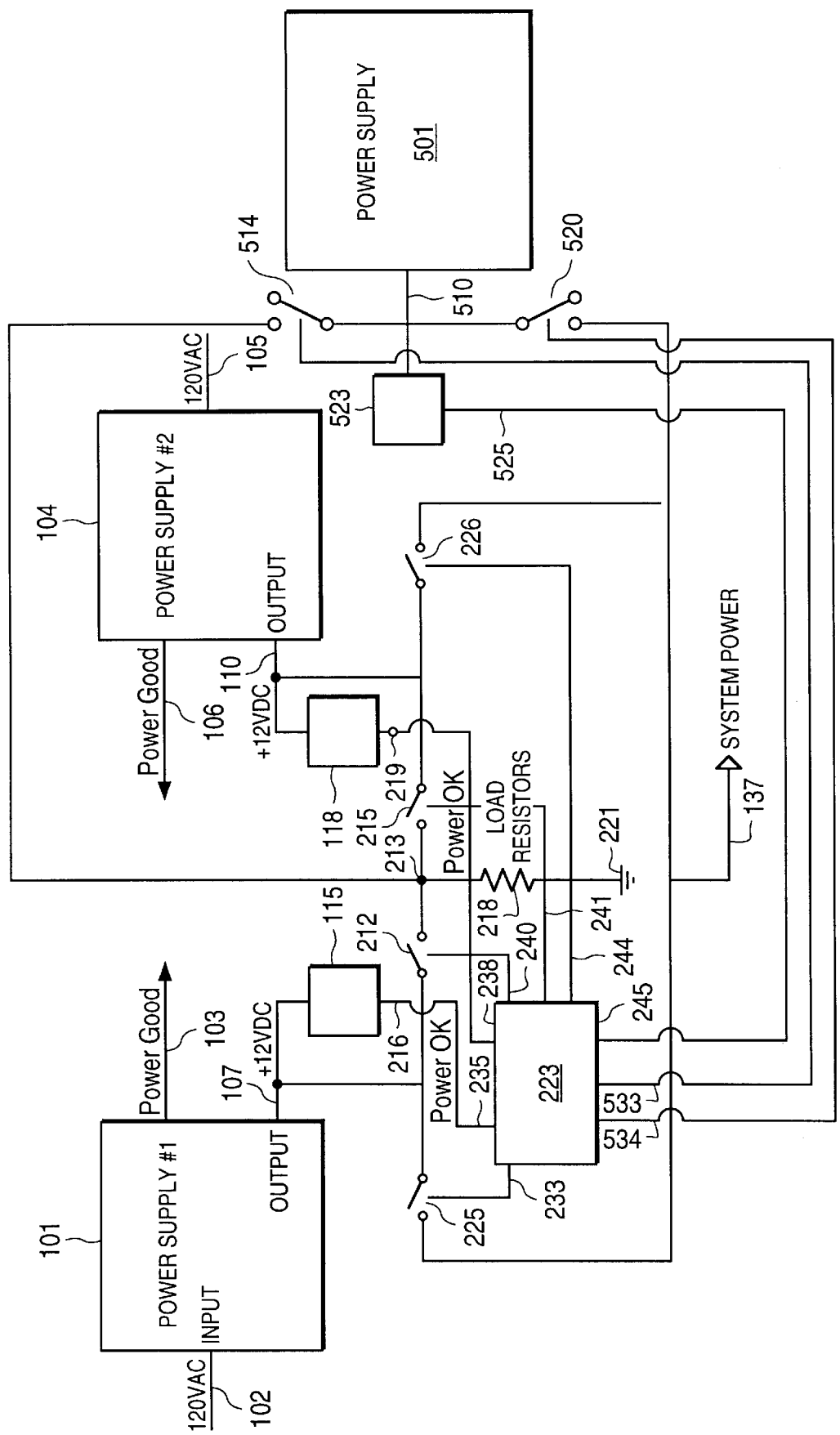
FIG. 5 is a block diagram of another embodiment of a system for supplying power to a computer system in accordance with the present invention.

Referring to FIG. 5, in an alternate embodiment, the power supply system may include more than two power supplies that supply power to the computer system. Such a system is useful in an N+1 redundant power supply arrangement. In this embodiment, the output of power supply 501 is connected to node 213 via switch 514. The output of power supply 501 is also connected to the computer system power input 137 via switch 520. Test circuit 523 is coupled to the output of power supply 501 and is capable of measuring the voltage of the output. Test circuit 523 provides a power Ok signal to indicate that power supply 501 is operating within the specified voltage range. Switches 514 and 520 are controlled by control circuit 223.

In operation, power supplies 101, 104, and 501 supply power to the computer system. After installing power supply 501, the control circuit 223 closes switch 514 to couple the output of power supply 501 to resistor 218. The test circuit then measures whether power supply 501 is operating within specified parameters. After the voltage level of power supply 501 has stabilized to within a specified range, the test circuit provides a power ok signal to control circuit 233. In response, control circuit 233 closes switch 520 thus allowing power supply 501 to supply power to the computer system at the computer system power input 137. Afterwards, the control circuit opens switch 514 to decouple to output of power supply 501 from resistive test load 218.

In another embodiment, a test circuit may be included within power supply 101. For example, referring to FIG. 2, power supply 101 provides a "power good" output signal which indicates that the output voltage is within a specified range. This power good signal may be provided to the control circuit to perform the function of the power Ok signal. In another embodiment, the control circuit 223 is responsive to both the power ok and power good signals in determining whether to close switch 225.

Those skilled in the art will recognize that present invention may be modified to test whether the power supply is operating within other specified parameters under the resistive test load before that power supply supplies power to the computer system. For example, test circuit 115 could be modified to test the ripple/noise of the power supplies. If the power supply output is not with the specified ripple/noise range, then the control circuit would not close appropriate switch.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method for supplying power to a computer system comprising:

supplying power to the computer system from a first power supply;

coupling a second power supply to a first resistive load;

testing the second power supply for specified parameters;

selectively supplying power to the computer system from the second power supply as determined by the testing;

decoupling the second power supply from the resistive load after the selectively supplying power.

2. The method of claim 1 wherein the testing further includes:

coupling the second power supply to a test circuit.

3. The method of claim 1 further comprising:

ceasing to supply power to the computer system from the first power supply if the second power supply is supplying power to the computer system.

4. The method of claim 3 further comprising:

removing the first power supply from the computer system.

5. The method of claim 3 further comprising:

coupling the first power supply to a second resistive load;

testing the first power supply for specified parameters;

selectively supplying power to the computer system from the first power supply as determined by the testing;

decoupling the first power supply from the second resistive load.

6. The method of claim 5 wherein the first resistive load and the second resistive load are the same.

7. The method of claim 1 further comprising:

installing the second power supply in the computer system.

8. The method of claim 1 wherein:

the coupling the second power supply to a resistive load includes coupling a first output of the second power supply to the resistive load;

the testing the second power supply includes determining whether the output is at a voltage level within a first specified voltage range, and the selectively supplying power includes supplying power to the computer system if the output of the second power supply tests as at a voltage level within the first specified voltage range.

9. The method of claim 8 wherein the decoupling the second power supply from the resistive load includes decoupling the first output from the resistive load.

10. The method of claim 8 wherein:

the coupling the power supply to a resistive load further includes coupling a second output of the second power supply to a second resistive load;

the testing the second power supply includes determining whether the second output is at a voltage level within a second specified voltage range; and the selectively supplying power includes supplying power to the computer system if the second output of the second power supply tests as at a voltage level within the second specified voltage range.

11. The method of claim 10 wherein the decoupling the second power supply from the resistive load includes decoupling the second output from the second resistive load.

12. The method of claim 1 further comprising:

installing a third power supply in the computer system;

coupling the third power supply to a second resistive load;

testing the third power supply for specified parameters;

selectively supplying power to the computer system from the third power supply as determined by the testing;

decoupling the third power supply from the second resistive load.

13. The method of claim 12 wherein the first resistive load and the second resistive load are the same resistive load.

14. The method of claim 1 further comprising:

providing a signal indicating that the second power supply is not operating within specified parameters as determined by the testing.

15. The method of claim 1 further comprising:

supplying a current from the second power supply to the first resistive load, where the testing the second power supply includes testing whether the second power supply supplies the current at a voltage level within a specified voltage range.

16. A computer system comprising:

a processor coupled to a power node:

a memory coupled to the processor and to the power node; and a power supply system, the power supply system including a first power supply, the first power supply supplying power to the power node;

a second power supply, supplying power to the power node; and a test and load circuit, the test and load circuit including a testing circuit, coupled to the second power supply;

a resistive load;

a first switch coupled to the second power supply and to the power node, the first switch selectively coupling the second power supply to the power node as determined by the testing circuit, the first switch coupling the second power supply to the power node while the first power supply supplies power to the computer system; and a second switch, coupled to the second power supply and the resistive load, the second switch decoupling the second power supply from the resistive load after the second power supply is coupled to supply power to the power node.

17. The computer system of claim 16 wherein the testing circuit tests an output of the second power supply for a voltage, the first switch coupling the second power supply to the power node based on whether the voltage tests within a specified range.

18. The computer system of claim 16 wherein the test and load circuit further includes a second resistive load;

a second testing circuit;

a third switch coupled to the first power supply and to the power node, the third switch selectively coupling the first power supply to the power node as determined by the testing circuit, the third switch capable of coupling the first power supply to the power node while the second power supply supplies power to the power node a fourth switch coupled to the first power supply and the second resistive load, the second switch decoupling the first power supply from the second resistive load after the first power supply is coupled to supply power to the power node.

19. The computer system of claim 18 wherein:
the first power supply includes a plurality of outputs capable of supplying power to the computer system, each output supplying power at a different voltage level, and
the power supply system includes a plurality of test and load circuits, each test and load circuit corresponding to a respective voltage level;
each test and load circuit includes a respective fourth switch and a respective second resistive load, each of the respective fourth switches coupling one of the plurality of outputs of the first power supply to one of respective second resistive loads, the respective fourth switches decoupling the plurality of outputs of the first power supply from the respective second resistive loads after the first power supply is coupled to supply power to the power node.

20. The computer system of claim 18 wherein the resistive load and the second resistive load are the same.

21. The computer system of claim 16 further comprising:
a control circuit, coupled to the testing circuit and the first switch, the control circuit responsive to a power ok signal from the testing circuit, the testing circuit generating the power ok signal in response to testing that the second power supply is operating within the specified parameters, the control circuit closing the first switch in response to the power ok signal.

22. The computer system of claim 16 further comprising:
a control circuit, coupled to the second switch, the control circuit opening the second switch after the second power supply is supplying power to the computer system.

23. A computer system comprising:
a processor; and
a power supply system for supplying power to the computer system including the processor, the power supply system capable of receiving power from at least two power supplies, the power supply system including;
a testing circuit;
a test load;
a first switch coupled to a power supply, the first switch selectively coupling the power supply to the computer system to supply power to the computer system as determined by the testing circuit, the first switch coupling the power supply to supply power to the computer system while a second power supply supplies power to the computer system; and
a second switch, coupled to the power supply and the test load, the second switch decoupling the power supply from the test load after the power supply is coupled to supply power to the computer system.

24. The computer system of claim 23 wherein the testing circuit tests an output of the power supply for a voltage, the first switch coupling the power supply to supply power the computer system based on whether the voltage tests within a specified range.

25. The computer system of claim 23 wherein the power supplies convert AC power to DC power to supply DC power to the computer system.

26. The computer system of claim 23 wherein the power supply system further includes:
a third switch coupled to the second power supply, the third switch selectively coupling the second power supply to the computer system to supply power to the computer system as determined by a testing circuit; and
a fourth switch, the fourth switch decoupling the second power supply from a test load after the second power supply is coupled to supply power to the computer system.

27. The computer system of claim 23 further comprising:
a control circuit, coupled to the testing circuit and the first switch, the control circuit responsive to a power ok signal from the testing circuit, the testing circuit generating the power ok signal in response to testing that the power supply is operating within the specified parameters, the control circuit closing the first switch in response to the power ok signal.

28. The computer system of claim 23 further comprising:
a control circuit, coupled to the second switch, the control circuit opening the second switch after the power supply is supplying power to the computer system.

29. A method for bringing on-line a second power supply to supply power while a first power supply is supplying power, the method comprising:
coupling a second power supply to a first test load;
testing the second power supply for specified parameters;
selectively supplying power from the second power supply as determined by the testing;
decoupling the second power supply from the test load after the selectively supplying power.

30. The method of claim 29 wherein the testing further includes:
coupling the second power supply to a test circuit.

31. The method of claim 29 further comprising:
ceasing to supply power from the first power supply if the second power supply is supplying power.

32. The method of claim 31 further comprising:
removing the first power supply.

33. The method of claim 31 further comprising:
coupling the first power supply to a second test load;
testing the first power supply for specified parameters;
selectively supplying power from the first power supply as determined by the testing;
decoupling the first power supply from the second test load.

34. The method of claim 33 wherein the first test load and the second test load are the same.

35. The method of claim 29 further comprising:
installing the second power supply.

36. The method of claim 29 wherein:
the coupling the second power supply to a test load includes coupling a first output of the second power supply to the test load;
the testing the second power supply includes determining whether the output is at a voltage level within a first specified voltage range, and
the selectively supplying power includes supplying power if the output of the second power supply tests as at a voltage level within the first specified voltage range.

37. The method of claim 36 wherein the decoupling the second power supply from the test load includes decoupling the first output from the test load.

38. The method of claim 36 wherein:
the coupling the power supply to a test load further includes coupling a second output of the second power supply to a second test load;
the testing the second power supply includes determining whether the second output is at a voltage level within a second specified voltage range; and
the selectively supplying power includes supplying power if the second output of the second power supply tests as at a voltage level within the second specified voltage range.

39. The method of claim 38 wherein the decoupling the second power supply from the test load includes decoupling the second output from the second test load.

40. The method of claim 29 further comprising:
installing a third power supply;
coupling the third power supply to a second test load;
testing the third power supply for specified parameters;
selectively supplying power from the third power supply as determined by the testing;
decoupling the third power supply from the second test load.

41. The method of claim 40 wherein the first test load and the second test load are the same test load.

42. The method of claim 29 further comprising:

providing a signal indicating that the second power supply is not operating within specified parameters as determined by the testing.

43. The method of claim 29 further comprising:

supplying a current from the second power supply to the first test load, where the testing the second power supply includes testing whether the second power supply supplies the current at a voltage level within a specified voltage range.

* * * * *